US012469133B2

(12) United States Patent
Zhang

(10) Patent No.: US 12,469,133 B2
(45) Date of Patent: Nov. 11, 2025

(54) METHOD AND SYSTEM FOR DETECTING FUNDUS IMAGE BASED ON DYNAMIC WEIGHTED ATTENTION MECHANISM

(71) Applicant: BEIJING ZHENHEALTH TECHNOLOGY CO., LTD., Beijing (CN)

(72) Inventor: Dongdong Zhang, Beijing (CN)

(73) Assignee: BEIJING ZHENHEALTH TECHNOLOGY CO., LTD., Beijing (CN)

( * ) Notice: Subject to any disclaimer, the term of this patent is extended or adjusted under 35 U.S.C. 154(b) by 335 days.

(21) Appl. No.: 18/319,979

(22) Filed: May 18, 2023

(65) Prior Publication Data

US 2023/0377147 A1 Nov. 23, 2023

(30) Foreign Application Priority Data

May 20, 2022 (CN) .......................... 202210548394.9

(51) Int. Cl.
*G06T 7/00* (2017.01)
*G06T 3/40* (2006.01)
(Continued)

(52) U.S. Cl.
CPC .............. *G06T 7/0012* (2013.01); *G06T 3/40* (2013.01); *G06T 5/20* (2013.01); *G06T 7/11* (2017.01);
(Continued)

(58) Field of Classification Search
CPC ........... G06T 7/0012; G06T 3/40; G06T 5/20; G06T 7/11
(Continued)

(56) References Cited

U.S. PATENT DOCUMENTS

2022/0180107 A1\* 6/2022 Sharma .................... G06N 3/04

FOREIGN PATENT DOCUMENTS

CN 108154505 6/2018
CN 109919873 A \* 6/2019
(Continued)

OTHER PUBLICATIONS

Yanhao Cheng, Weibin Liu, Weiwei Xing, Weighted feature fusion and attention mechanism for object detection, Journal of Electronic Imaging, vol. 30, Issue 2, 023015 (Year: 2021).\*
(Continued)

*Primary Examiner* — Claire X Wang
(74) *Attorney, Agent, or Firm* — DLA Piper LLP (US)

(57) ABSTRACT

The present disclosure provides a method and system for detecting a fundus image based on a dynamic weighted attention mechanism. Lesion information in a fundus image of a premature infant is detected using a fundus image segmentation model. First, the fundus image is consecutively downsampled. Dynamical weighted attention fusion is performed on an obtained downsampling feature and an obtained downsampling feature of an adjacent layer. The weighted and fused features are fused with an output feature of a corresponding upsampling layer. Finally, a classification convolution operation is performed on an output of an n-th upsampling layer to obtain a lesion probability for each pixel. The present disclosure performs hierarchical feature fusion on a shallow network model using the dynamic weighted attention mechanism, which can reduce complexity of algorithm design, shorten a running time of an algorithm, and reduce excessive occupation of graphics processing unit (GPU) resources while ensuring recognition accuracy.

7 Claims, 7 Drawing Sheets

(51) Int. Cl.
G06T 5/20 (2006.01)
G06T 7/11 (2017.01)
G06V 10/764 (2022.01)
G06V 10/80 (2022.01)

(52) U.S. Cl.
CPC .......... *G06V 10/764* (2022.01); *G06V 10/806* (2022.01); *G06T 2207/20016* (2013.01); *G06T 2207/20076* (2013.01); *G06T 2207/20081* (2013.01); *G06T 2207/20084* (2013.01); *G06T 2207/20132* (2013.01); *G06T 2207/30041* (2013.01); *G06T 2207/30096* (2013.01); *G06V 2201/03* (2022.01)

(58) Field of Classification Search
USPC ........................................................ 382/128
See application file for complete search history.

(56) References Cited

FOREIGN PATENT DOCUMENTS

| | | | | |
|---|---|---|---|---|
| CN | 112819797 | | 5/2021 | |
| CN | 114120053 A | * | 3/2022 | .............. G06F 18/29 |
| CN | 114241274 A | * | 3/2022 | ............ G06F 18/214 |
| CN | 114612389 A | * | 6/2022 | .............. G06N 3/045 |
| CN | 114612670 A | * | 6/2022 | ......... G06F 18/2415 |
| CN | 111489287 B | * | 2/2024 | ................ G06T 3/04 |
| CN | 114821064 B | * | 1/2025 | ............. G06N 3/045 |
| JP | 2023107728 A | * | 8/2023 | ............. G06V 20/41 |

OTHER PUBLICATIONS

Weighted feature fusion and attention mechanism for object detection (Year: 2021).*

* cited by examiner

METHOD AND SYSTEM FOR DETECTING FUNDUS IMAGE BASED ON DYNAMIC WEIGHTED ATTENTION MECHANISM

CROSS-REFERENCE TO RELATED APPLICATION

This application claims priority to Chinese patent application number 202210548394.9, filed May 20, 2022, which is incorporated by reference in its entirety.

TECHNICAL FIELD

The present disclosure relates to the technical field of image processing, and in particular, to a method and system for detecting a fundus image based on a dynamic weighted attention mechanism.

BACKGROUND

The technology of image segmentation detection for image detection is a classic problem in computer vision research, and has become a hot spot in the field of image understanding. Traditional segmentation detection methods include segmenting an image into several disjoint regions based on grayscale, color, spatial texture, and geometric shape, such that these features show consistency or similarity in the same region. In recent years, with the continuous development of deep learning technology, the image segmentation technology has also made rapid progress, and this technology has been widely used in fields such as unmanned driving, augmented reality, and security monitoring.

However, in order to extract richer features, the existing segmentation detection methods using deep learning often set the network model very deep, which not only adds to algorithm complexity and running time of the algorithm, but also occupies too many graphics processing unit (GPU) resources.

Therefore, there is an urgent need in the art for a technical solution that can reduce the complexity of the algorithm while ensuring the recognition accuracy.

SUMMARY

An objective of the present disclosure is to provide a method and system for detecting a fundus image based on a dynamic weighted attention mechanism. Hierarchical feature fusion is performed on a shallow network model using the dynamic weighted attention mechanism, which can reduce complexity of algorithm design, shorten a running time of an algorithm, and reduce excessive occupation of GPU resources while ensuring recognition accuracy.

In order to achieve the above objective, the present disclosure provides the following technical solutions:

The present disclosure provides a method for detecting a fundus image based on a dynamic weighted attention mechanism, including:
  obtaining a fundus image to be used; and
  detecting lesion information of the fundus image using a fundus image segmentation model, where the fundus image segmentation model includes n consecutive downsampling layers and n consecutive upsampling layers, and an n-th downsampling layer is connected to a first upsampling layer:
  performing consecutive n-layer downsampling on the fundus image using the fundus image segmentation model to obtain n layers of downsampling output features;
  fusing a downsampling output feature of an i-th layer and a downsampling output feature of an adjacent layer using the dynamic weighted attention mechanism to obtain a weighted feature of the i-th layer, where i∈[1, n], and a weighted feature of a first layer is a downsampling output feature of the first layer;
  fusing the weighted feature of the i-th layer with an output feature of an (n−i)-th upsampling layer, and inputting the fused features to an (n−i+1)-th upsampling layer after deconvolution, where an input of the first upsampling layer is a feature after the fusion and deconvolution of a weighted feature of an n-th layer and a downsampling output feature of the n-th layer; and
  performing a classification convolution operation on an output of an n-th upsampling layer to obtain a lesion probability for each pixel.

In some embodiments, the process of performing a classification convolution operation on an output of an n-th upsampling layer to obtain a lesion probability for each pixel may specifically include:
  performing a 1×1×c convolution operation on the output of the n-th upsampling layer to obtain the lesion probability for each pixel, where c represents a number of classification categories.

In some embodiments, the method may further include the following step after the step of performing a classification convolution operation on an output of an n-th upsampling layer:
  normalizing convolution results using a softmax normalization function.

In some embodiments, the process of fusing a downsampling output feature of an i-th layer and a downsampling output feature of an adjacent layer using the dynamic weighted attention mechanism to obtain a weighted feature of the i-th layer, where i∈[1, n] may specifically include:
  obtaining the downsampling output feature of the i-th layer, a downsampling output feature of an (i−1)-th layer, and a downsampling output feature of an (i+1)-th layer; and
  performing hierarchical feature fusion on the downsampling output feature of the i-th layer, the downsampling output feature of the (i−1)-th layer, and the downsampling output feature of the (i+1)-th layer:
  calculating a mean and a standard deviation of the downsampling output feature of the i-th layer, the downsampling output feature of the (i−1)-th layer, and the downsampling output feature of the (i+1)-th layer in a channel direction;
  calculating a dynamic weight of the downsampling output feature of the i-th layer, the downsampling output feature of the (i−1)-th layer, and the downsampling output feature of the (i+1)-th layer through one-dimensional Gaussian distribution according to the mean and the standard deviation;
  calculating a weight of each pixel in the downsampling output feature of the i-th layer, the downsampling output feature of the (i−1)-th layer, and the downsampling output feature of the (i+1)-th layer in the channel direction according to the dynamic weight;
  calculating an attention weight of the downsampling output feature of the i-th layer, the downsampling output feature of the (i−1)-th layer, and the downsampling output feature of the (i+1)-th layer according to the weight of each pixel in the channel direction; and
  performing weighted attention feature fusion on the downsampling output feature of the i-th layer, the downsampling output feature of the (i−1)-th layer, and the downsampling output feature of the (i+1)-th layer according to the attention weight to obtain the weighted feature of the i-th layer.

In some embodiments, the method may further include the following steps after the step of obtaining the downsampling output feature of the i-th layer, a downsampling output feature of an (i−1)-th layer, and a downsampling output feature of an (i+1)-th layer:

performing a 1×1×c convolution operation on the downsampling output feature of the i-th layer, where c represents a number of output channels;

performing downsampling and a 1×1×c convolution operation on the downsampling output feature of the (i−1)-th layer; and performing upsampling and a 1×1×c convolution operation on the downsampling output feature of the (i+1)-th layer.

In some embodiments, a process of training the fundus image segmentation model may specifically include:

obtaining gold standard data, where the gold standard data is a fundus image of a target area labeled by a professional ophthalmologist; and training a network model based on the dynamic weighted attention mechanism using the gold standard data to obtain the fundus image segmentation model.

In some embodiments, the method may further include the following step after the step of obtaining a fundus image to be used:

performing invalid region cropping and image enhancement on the fundus image.

In some embodiments, a formula of image enhancement is:

$$e\_image(x,y)=4*crop\_image(x,y)-4*Gaussion(x,y,\rho)+128$$

where e_image(x, y) represents an enhanced image, crop_image(x, y) represents an image after invalid region cropping, and Gaussion(x, y, ρ) represents Gaussian filter with a standard deviation of ρ.

The present disclosure further provides a system for detecting a fundus image based on a dynamic weighted attention mechanism, including:

a data obtaining unit configured to obtain a fundus image to be used; and a lesion detection unit configured to detect lesion information of the fundus image using a fundus image segmentation model, where the fundus image segmentation model includes n consecutive downsampling layers and n consecutive upsampling layers, and an n-th downsampling layer is connected to a first upsampling layer, where the lesion detection unit specifically includes:

a downsampling module configured to perform consecutive n-layer downsampling on the fundus image using the fundus image segmentation model to obtain n layers of downsampling output features;

an attention mechanism weighting module configured to fuse a downsampling output feature of an i-th layer and a downsampling output feature of an adjacent layer using the dynamic weighted attention mechanism to obtain a weighted feature of the i-th layer, where i∈[1,n] and a weighted feature of a first layer is a downsampling output feature of the first layer;

a fusion module configured to fuse the weighted feature of the i-th layer with an output feature of an (n−i)-th upsampling layer, and input the fused features to an (n−i+1)-th upsampling layer after deconvolution, where an input of the first upsampling layer is a feature after the fusion and deconvolution of a weighted feature of an n-th layer and a downsampling output feature of the n-th layer; and a detection module configured to perform a classification convolution operation on an output of an n-th upsampling layer to obtain a lesion probability for each pixel.

In some embodiments, the process of fusing a downsampling output feature of an i-th layer and a downsampling output feature of an adjacent layer using the dynamic weighted attention mechanism to obtain a weighted feature of the i-th layer, where i∈[1, n] may specifically include:

obtaining the downsampling output feature of the i-th layer, a downsampling output feature of an (i−1)-th layer, and a downsampling output feature of an (i+1)-th layer; and performing hierarchical feature fusion on the downsampling output feature of the i-th layer, the downsampling output feature of the (i−1)-th layer, and the downsampling output feature of the (i+1)-th layer:

calculating a mean and a standard deviation of the downsampling output feature of the i-th layer, the downsampling output feature of the (i−1)-th layer, and the downsampling output feature of the (i+1)-th layer in a channel direction;

calculating a dynamic weight of the downsampling output feature of the i-th layer, the downsampling output feature of the (i−1)-th layer, and the downsampling output feature of the (i+1)-th layer through one-dimensional Gaussian distribution according to the mean and the standard deviation;

calculating a weight of each pixel in the downsampling output feature of the i-th layer, the downsampling output feature of the (i−1)-th layer, and the downsampling output feature of the (i+1)-th layer in the channel direction according to the dynamic weight;

calculating an attention weight of the downsampling output feature of the i-th layer, the downsampling output feature of the (i−1)-th layer, and the downsampling output feature of the (i+1)-th layer according to the weight of each pixel in the channel direction; and performing weighted attention feature fusion on the downsampling output feature of the i-th layer, the downsampling output feature of the (i−1)-th layer, and the downsampling output feature of the (i+1)-th layer according to the attention weight to obtain the weighted feature of the i-th layer.

According to the specific embodiments provided by the present disclosure, the present disclosure discloses the following technical effects:

According to the present disclosure, lesion information of the fundus image is detected using a fundus image segmentation model. The fundus image segmentation model includes n consecutive downsampling layers and n consecutive upsampling layers, and an n-th downsampling layer is connected to a first upsampling layer. First, the fundus image is consecutively downsampled. Dynamical weighted attention fusion is performed on an obtained downsampling feature and an obtained downsampling feature of an adjacent layer, so as to perform hierarchical feature fusion on a shallow network model using the dynamic weighted attention mechanism. The weighted and fused features are fused with an output feature of a corresponding upsampling layer. Finally, a classification convolution operation is performed on an output of an n-th upsampling layer to obtain a lesion probability for each pixel. Since hierarchical feature fusion is performed on the shallow network model using the dynamic weighted attention mechanism, the method can reduce complexity of algorithm design, shorten a running time of an algorithm, and reduce excessive occupation of GPU resources while ensuring recognition accuracy.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1:
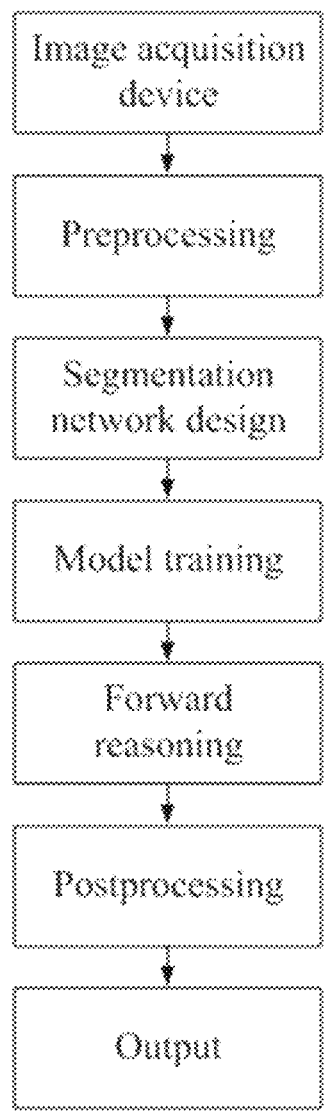
FIG. 1 is an overall working flowchart of a method for detecting retinopathy of prematurity (ROP) provided by an embodiment of the present disclosure.

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for detecting a fundus image based on a dynamic weighted attention mechanism. Hierarchical feature fusion is performed on a shallow network model using the dynamic weighted attention mechanism, which can reduce complexity of algorithm design, shorten a running time of an algorithm, and reduce excessive occupation of GPU resources while ensuring recognition accuracy.

In the past 20 years, a large number of methods for detecting ROP based on color fundus images have emerged in academia. In traditional methods, retinal fundus images are analyzed using hand-crafted features, such as vessel dilation, vessel curvature, and vein features, for the detection of ROP. These methods need to set specific rules, have high complexity, and have weak robustness, which is not conducive to the detection of ROP. In recent years, artificial intelligence technology represented by deep learning has achieved remarkable development, and its application in the field of medical imaging diagnosis has also received more and more attention. Different from traditional image feature recognition, the deep learning method does not need to manually design some hand-crafted features, and its network can automatically extract features during learning. Compared with the hand-designed features, the extracted features are more numerous and more abstract, and can express some content that cannot be expressed by hand-crafted features. Color fundus images themselves contain abundant information about body structures or tissues. By recognizing and understanding these details in fundus images, algorithms can assist doctors in diagnosing related diseases. Therefore, designing a system for detecting ROP based on deep learning to assist doctors in disease diagnosis has huge advantages over traditional image processing methods.

However, the currently provided methods for detecting ROP have the following shortcomings.

1. The detection method is not robust. During shooting of the fundus of the newborn, due to the limited degree of cooperation, the captured fundus images are often too dark and have light leakage and incorrect optic disk position. The traditional recognition algorithm is easily interfered by such factors, which brings great challenges to the detection of ROP.

2. Some methods using deep learning only use convolutional neural networks to classify whether there is ROP, lacking intuitive display of lesions. However, in the process of diagnosis and treatment, doctors often need to give clear evidence to support whether the fundus read on the film belongs to ROP. Therefore, labeling the suspicious lesions is indispensable in the auxiliary clinical diagnosis process.

3. In order to extract richer features, the network model is often set very deep, which not only leads to an increase in algorithm complexity and a long running time of the algorithm, but also occupies too much GPU resources. Hierarchical feature fusion is performed on a shallow network model using the dynamic weighted attention mechanism, which can reduce complexity of algorithm design, shorten a running time of an algorithm, and reduce excessive occupation of GPU resources while ensuring recognition accuracy.

In view of the above-mentioned existing situation, the present disclosure provides a method and system for detecting a fundus image based on a dynamic weighted attention mechanism. Through an image acquisition device, the fundus image of the newborn is acquired. The fundus image is first processed by a preprocessing module, which performs operations such as invalid region cropping and image enhancement. Then, the processed image is input into the network model integrated with the dynamic weighted attention mechanism to segment the visible lesions, and then input into the postprocessing module for further denoising of the recognized lesions. Finally, the complete lesion segmentation image is output through the output module. The overall working flowchart is shown in FIG. 1.

To make the above-mentioned objective, features, and advantages of the present disclosure clearer and more comprehensible, the present disclosure will be further described in detail below in conjunction with the accompanying drawings and specific embodiments.

Embodiment I

Figure 2:
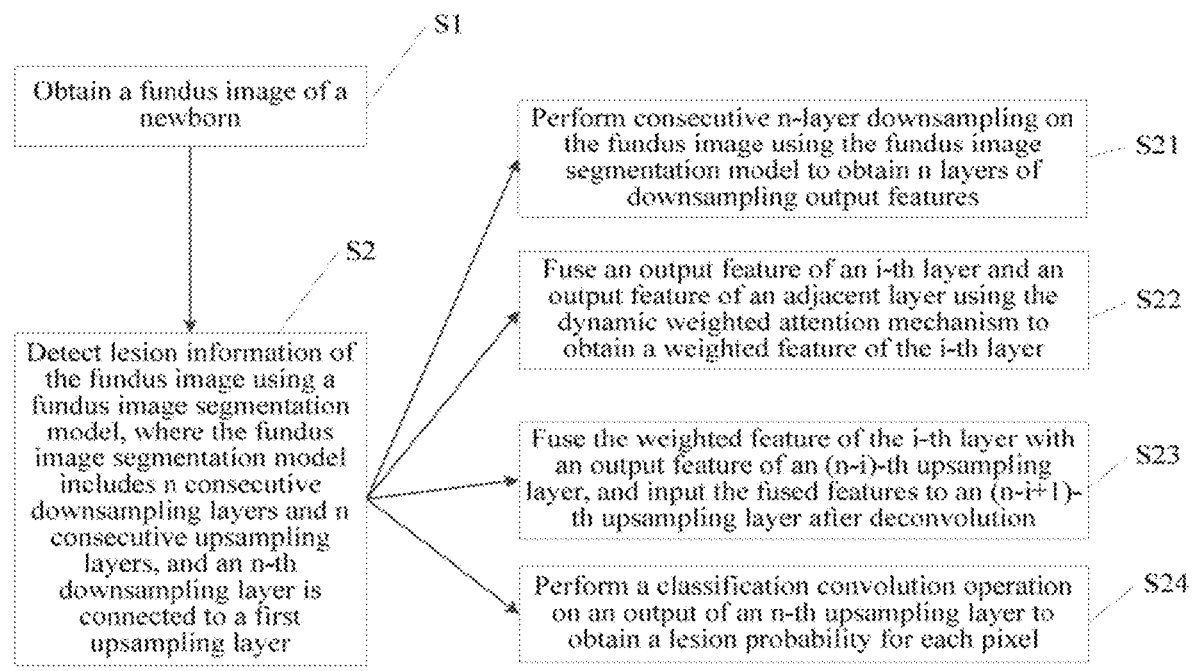
FIG. 2 is a method for detecting a fundus image based on dynamic weighted attention provided by Embodiment I of the present disclosure.

As shown in FIG. 2, the present embodiment provides a method for detecting a fundus image based on a dynamic weighted attention mechanism, including the following steps.

S1, a fundus image to be used is obtained.

During shooting of the newborn, due to the limited degree of cooperation, the captured fundus images in most cases are not conducive to the recognition of lesions. Therefore, it is necessary to perform invalid region cropping and image enhancement on the fundus images of the newborn.

A formula of image enhancement is:

$$e\_image(x,y)=4*crop\_image(x,y)-4*Gaussion(x,y,\rho)+128$$

where e_image(x, y) represents an enhanced image, crop_image(x, y) represents an image after invalid region cropping, and Gaussion(x, y, ρ) represents Gaussian filter with a standard deviation of ρ.

S2, lesion information of the fundus image is detected using a fundus image segmentation model. The fundus image segmentation model includes n consecutive downsampling layers and n consecutive upsampling layers, and an n-th downsampling layer is connected to a first upsampling layer. The method includes the following specific steps.

S21, consecutive n-layer downsampling is performed on the fundus image using the fundus image segmentation model to obtain n layers of downsampling output features.

The fundus image segmentation model provided in the present embodiment performs consecutive four-layer downsampling. The downsampling operation for each layer is three 3×3 convolution operations and one maximum pooling operation. The stride of the maximum pooling operation is set to 2. After 4 layers of downsampling, the feature map FE that has been downsampled by a factor of 16 is obtained.

S22, a downsampling output feature of an i-th layer and a downsampling output feature of an adjacent layer are fused using the dynamic weighted attention mechanism to obtain a weighted feature of the i-th layer, where $i \in [1, n]$. A weighted feature of a first layer is a downsampling output feature of the first layer without dynamic weighted attention fusion.

Figure 3:
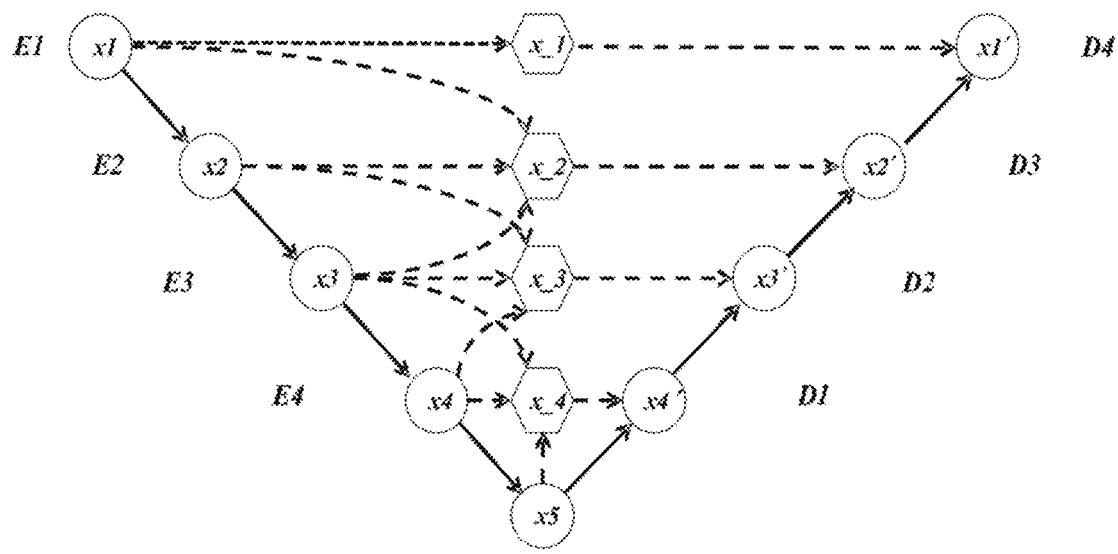
FIG. 3 is a schematic diagram of a fundus image segmentation model including four consecutive downsampling layers and four consecutive upsampling layers provided by Embodiment I of the present disclosure.

In the present embodiment, a total of 4 layers are still taken as an example, that is, n=4. The weighted feature of the first layer is the downsampling output feature of the first layer without dynamic weighted attention fusion. The downsampling output features of the second layer, the first layer and the second layer are fused using the dynamic weighted attention mechanism to obtain the weighted feature of the second layer. The downsampling output features of the third layer, the second layer and the fourth layer are fused using the dynamic weighted attention mechanism to obtain the weighted feature of the third layer. The downsampling output features of the fourth layer and the third layer are fused using the dynamic weighted attention mechanism to obtain the weighted feature of the fourth layer. A schematic diagram of the fundus image segmentation model including four consecutive downsampling layers and four consecutive upsampling layers in the present embodiment is shown in FIG. 3.

A process of fusing a downsampling output feature of an i-th layer and a downsampling output feature of an adjacent layer using the dynamic weighted attention mechanism to obtain a weighted feature of the i-th layer, where $i \in [1, n]$ specifically includes the following steps.

First, the downsampling output feature of the i-th layer, a downsampling output feature of an (i−1)-th layer, and a downsampling output feature of an (i+1)-th layer are obtained. Then, a 1×1×c convolution operation is performed on the downsampling output feature of the i-th layer, where c represents a number of output channels. Downsampling by a factor of 2 and a 1×1×c convolution operation are performed on the downsampling output feature of the (i−1)-th layer. Upsampling by a factor of 2 and a 1×1×c convolution operation are performed on the downsampling output feature of the (i+1)-th layer.

Then, hierarchical feature fusion is performed on the downsampling output feature of the i-th layer, the downsampling output feature of the (i−1)-th layer, and the downsampling output feature of the (i+1)-th layer. The hierarchical feature fusion specifically includes the following sub-steps.

A1, a mean and a standard deviation of the downsampling output feature of the i-th layer, the downsampling output feature of the (i−1)-th layer, and the downsampling output feature of the (i+1)-th layer in a channel direction are calculated.

A2, a dynamic weight of the downsampling output feature of the i-th layer, the downsampling output feature of the (i−1)-th layer, and the downsampling output feature of the (i+1)-th layer is calculated through one-dimensional Gaussian distribution according to the mean and the standard deviation.

A3, a weight of each pixel in the downsampling output feature of the i-th layer, the downsampling output feature of the (i−1)-th layer, and the downsampling output feature of the (i+1)-th layer in the channel direction is calculated according to the dynamic weight.

A4, an attention weight of the downsampling output feature of the i-th layer, the downsampling output feature of the (i−1)-th layer, and the downsampling output feature of the (i+1)-th layer is calculated according to the weight of each pixel in the channel direction.

A5, weighted attention feature fusion is performed on the downsampling output feature of the i-th layer, the downsampling output feature of the (i−1)-th layer, and the downsampling output feature of the (i+1)-th layer according to the attention weight to obtain the weighted feature of the i-th layer.

A formula of feature fusion is: $fuse^i = W^{i-1} * e\_out^{i-1'} + W^i * e\_out^{i'} + W^{i+1} * e\_out^{i+1'}$ where $fuse^i$ represents an output after feature weighting of the downsampling output feature of the i-th layer, the downsampling output feature of the (i−1)-th layer, and the downsampling output feature of the (i+1)-th layer, $W^{i-1}$, $W^i$, and $W^{i+1}$ are attention weights of the output feature of the (i−1)-th layer, the output feature of the i-th layer, and the output feature of the (i+1)-th layer respectively, and $e\_out^{i-1'}$, $e\_out^{i'}$, and $e\_out^{i+1'}$ represent the downsampling output feature of the (i−1)-th layer, the downsampling output feature of the i-th layer, and the downsampling output feature of the (i+1)-th layer respectively.

S23, the weighted feature of the i-th layer is fused with an output feature of an (n−i)-th upsampling layer, and the fused features are input to an (n−i+1)-th upsampling layer after deconvolution. An input of the first upsampling layer is a feature after the fusion and deconvolution of a weighted feature of an n-th layer and a downsampling output feature of the n-th layer.

In the specific fusion process, a formula $d\_out^i$=repeat(conv(concate(fuse$^i$, $d_{in}^{n-i}$, axis=2), 3,3), 2) is used for fusion, where repeat(x,2) means performing the x operation twice, concate(x,y,axis=2) means stacking x and y in the channel direction, conv(x,3,3) means performing a 3×3 convolution operation on x, fuse$^i$ and $d\_in^{n-i}$ represent the weighted feature of the i-th layer and the output feature of the (n−i)-th upsampling layer respectively, and $d\_out^i$ represents the fused feature.

In the present embodiment, a total of 4 layers are still taken as an example, that is, n=4. The input of the first upsampling layer is a feature after the fusion and deconvolution of the weighted feature of the fourth layer and the downsampling output feature of the fourth layer. The weighted feature of the third layer is fused with the output feature of the first upsampling layer, and the fused features are input to the second upsampling layer after deconvolution. The weighted feature of the second layer is fused with the output feature of the second upsampling layer, and the fused features are input to the third upsampling layer after deconvolution. The weighted feature of the first layer is fused with the output feature of the third upsampling layer, and the fused features are input to the fourth upsampling layer after deconvolution.

S24, a classification convolution operation is performed on an output of an n-th upsampling layer to obtain a lesion probability for each pixel. In the present embodiment, a classification convolution operation is performed on the output of the fourth upsampling layer to obtain the lesion probability for each pixel.

Specifically, a 1×1×c convolution operation is performed on the upsampling feature map of the last layer, where c represents a number of classification categories. Then convolution results are normalized to the 0-1 interval using a softmax normalization function to obtain the probability of the corresponding category of each pixel. In the present disclosure, 0.5 is taken as the judgment basis to obtain the lesion probability for each pixel.

A process of training the fundus image segmentation model specifically includes the following steps.

Gold standard data is obtained. The gold standard data is a fundus image of a target area labeled by a professional ophthalmologist.

A network model based on the dynamic weighted attention mechanism is trained using the gold standard data to obtain the fundus image segmentation model.

The UNet network architecture is a typical encoder-decoder network architecture model, which has been widely used in biomedical segmentation tasks. However, the UNet network model has the following shortcomings: (1) The original UNet network model is just a simple channel stacking between the corresponding layers of the encoder and the decoder, and the hierarchical feature relationship is not considered. (2) Although some improved versions of the UNet network model take into account the hierarchical feature relationship and use the features extracted from different layers for fusion processing, the importance of each layer of features is treated equally during hierarchical feature fusion, which actually ignores the fact that the importance of the information actually expressed by different layers is different. In the present embodiment, based on the above two shortcomings, two improvements are made to the UNet network model.

(1) Feature fusion at different levels is added to improve the segmentation ability of the entire network model.

(2) A dynamic weight update module is added to the channel dimension in the fusion process of features at different levels to maximize the use of salient features extracted from different feature layers.

Embodiment II

Figure 4:
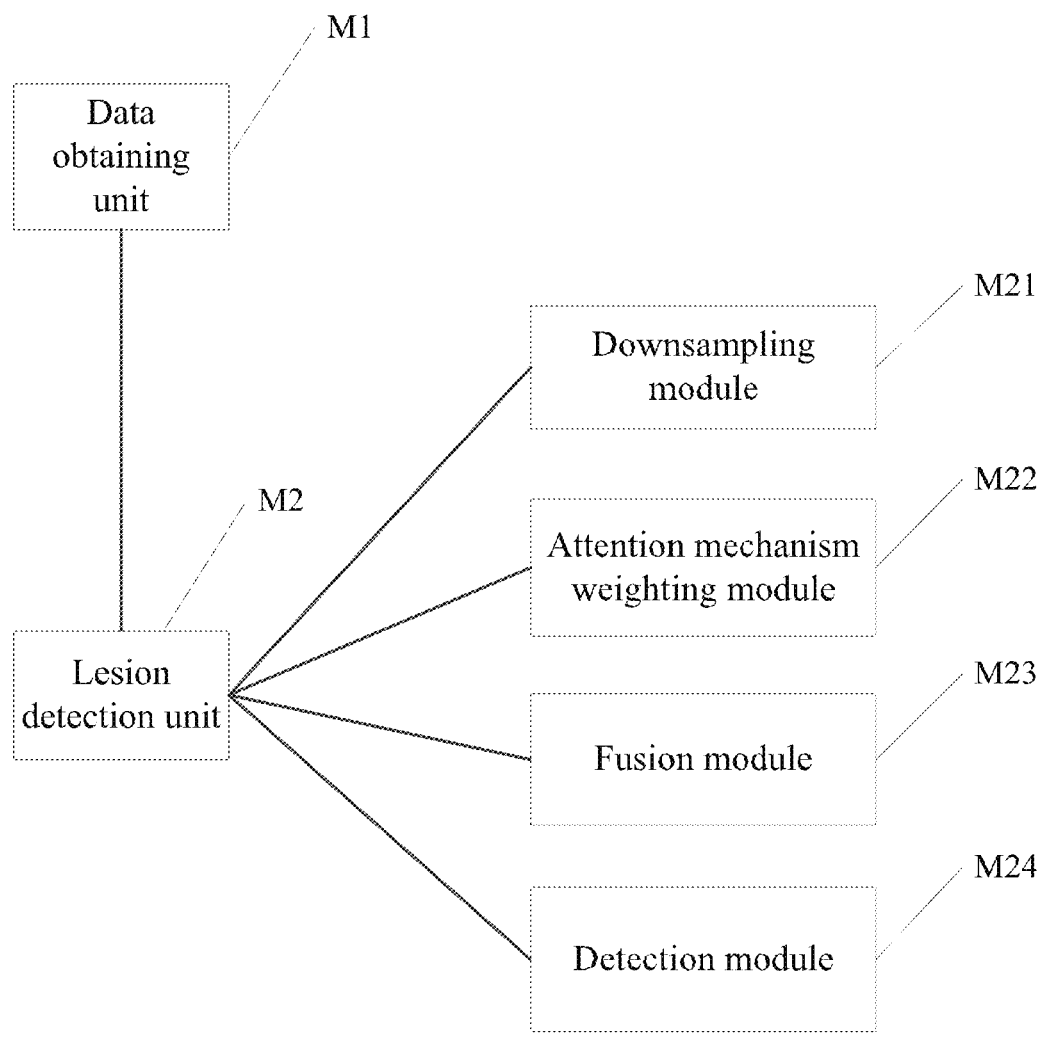
FIG. 4 is a block diagram of a system for detecting a fundus image based on dynamic weighted attention provided by Embodiment II of the present disclosure.

As shown in FIG. 4, the present embodiment provides a system for detecting a fundus image based on a dynamic weighted attention mechanism, including: a data obtaining unit M1 and a lesion detection unit M2.

The data obtaining unit M1 is configured to obtain a fundus image to be used.

The lesion detection unit M2 is configured to detect lesion information of the fundus image using a fundus image segmentation model. The fundus image segmentation model includes n consecutive downsampling layers and n consecutive upsampling layers, and an n-th downsampling layer is connected to a first upsampling layer.

The lesion detection unit M2 specifically includes: a downsampling module M21, an attention mechanism weighting module M22, a fusion module M23, and a detection module M24.

The downsampling module M21 is configured to perform consecutive n-layer downsampling on the fundus image using the fundus image segmentation model to obtain n layers of downsampling output features.

The attention mechanism weighting module M22 is configured to fuse a downsampling output feature of an i-th layer and a downsampling output feature of an adjacent layer using the dynamic weighted attention mechanism to obtain a weighted feature of the i-th layer, where i∈[1,n].

The fusion module M23 is configured to fuse the weighted feature of the i-th layer with an output feature of an (n−i)-th upsampling layer, and input the fused features to an (n−i+1)-th upsampling layer after deconvolution. An input of the first upsampling layer is a feature after the fusion and deconvolution of a weighted feature of an n-th layer and a downsampling output feature of the n-th layer.

The detection module M24 is configured to perform a classification convolution operation on an output of an n-th upsampling layer to obtain a lesion probability for each pixel.

A process of fusing a downsampling output feature of an i-th layer and a downsampling output feature of an adjacent layer using the dynamic weighted attention mechanism to obtain a weighted feature of the i-th layer, where i∈[1, n] specifically includes the following steps.

The downsampling output feature of the i-th layer, a downsampling output feature of an (i−1)-th layer, and a downsampling output feature of an (i+1)-th layer are obtained.

Hierarchical feature fusion is performed on the downsampling output feature of the i-th layer, the downsampling output feature of the (i−1)-th layer, and the downsampling output feature of the (i+1)-th layer.

A mean and a standard deviation of the downsampling output feature of the i-th layer, the downsampling output feature of the (i−1)-th layer, and the downsampling output feature of the (i+1)-th layer in a channel direction are calculated.

A dynamic weight of the downsampling output feature of the i-th layer, the downsampling output feature of the (i−1)-th layer, and the downsampling output feature of the (i+1)-th layer is calculated through one-dimensional Gaussian distribution according to the mean and the standard deviation.

A weight of each pixel in the downsampling output feature of the i-th layer, the downsampling output feature of the (i−1)-th layer, and the downsampling output feature of the (i+1)-th layer in the channel direction is calculated according to the dynamic weight.

An attention weight of the downsampling output feature of the i-th layer, the downsampling output feature of the (i−1)-th layer, and the downsampling output feature of the (i+1)-th layer is calculated according to the weight of each pixel in the channel direction.

Weighted attention feature fusion is performed on the downsampling output feature of the i-th layer, the downsampling output feature of the (i−1)-th layer, and the downsampling output feature of the (i+1)-th layer according to the attention weight to obtain the weighted feature of the i-th layer.

Embodiment III

The present embodiment provides a system for detecting a fundus image based on a dynamic weighted attention mechanism, including: an image acquisition device, a preprocessing module, a segmentation network module, a model training module, a forward reasoning module, a postprocessing module and an output module.

As a data acquisition terminal, the image acquisition device can acquire image data by directly connecting acquisition equipment such as a neonatal fundus camera, or acquire existing fundus data stored on other equipment in advance. There are no restrictions on the source of data, such as data from equipment, network, and local storage.

The main function of the preprocessing module is to standardize the input image, and the standardized processing includes two parts. One part is to remove the invalid region of the fundus image of the newborn and reduce its influence on the network model. During the shooting of the newborn, due to the limited degree of cooperation, the fundus images captured in most cases are dark, which is not conducive to the recognition of lesions. Therefore, the second part of the standardized processing is the enhancement of fundus images.

The specific operation steps of the preprocessing module are as follows.

Figure 5:
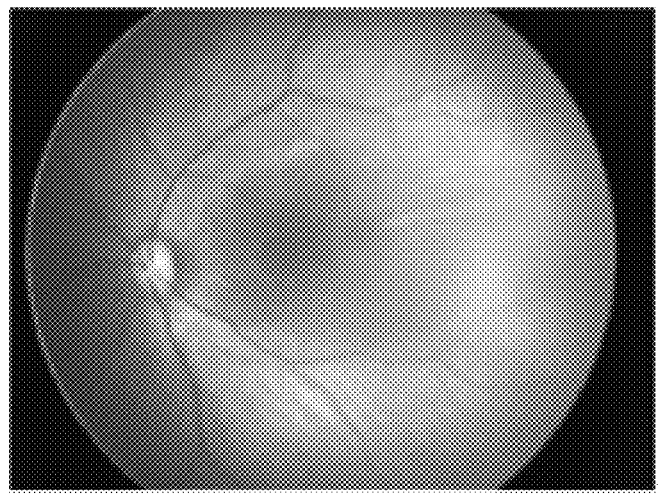
FIG. 5 is a schematic diagram of an original input image provided by Embodiment III of the present disclosure.
Figure 6:
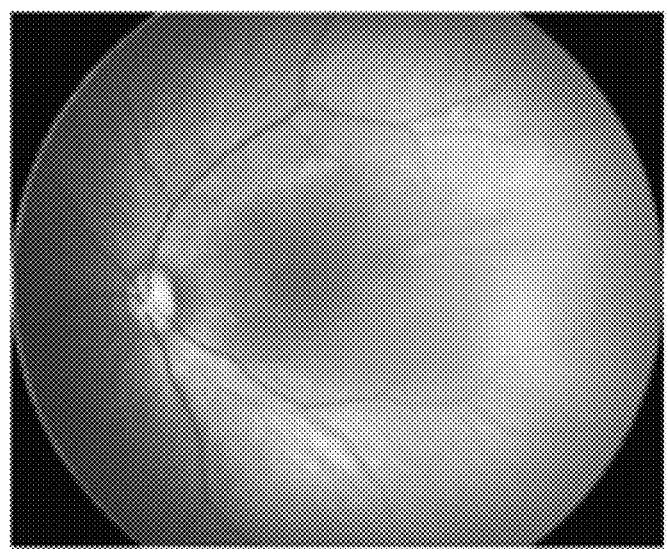
FIG. 6 is a schematic diagram of a cropped image provided by Embodiment III of the present disclosure.

1. The invalid region of the fundus image acquired by a fixed type of fundus camera is relatively fixed and will not change with the shooting angle and shooting personnel. Therefore, the range of the cropped invalid region can be determined in advance. The coordinates of the upper left corner of the valid region are recorded as [L_X, L_Y], and the coordinates of the lower right corner are recorded as [R_X, R_Y]. The input image is recorded as ori_image, and the invalid region can be cropped by a formula (1). The cropped image is recorded as crop_image. The original input image is shown in FIG. 5, and the cropped image is shown in FIG. 6.

$$\text{crop\_image} = \text{ori\_image}[L\_Y:R\_Y, L\_X:R\_X, 0:3] \quad (1)$$

In the formula (1), L_Y:R_Y means from the L_Y row to the R_Y row of the image, L_X:R_X means from the L_X column to the R_X column of the image, and 0:3 represents the B, G, and R channels of the color image.

Figure 7:
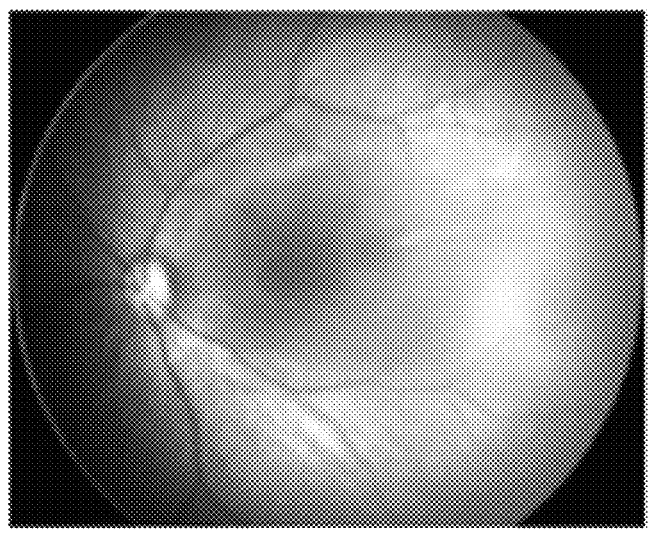
FIG. 7 is a schematic diagram of an image after image enhancement processing provided by Embodiment III of the present disclosure.

2. Enhancement processing is performed on the cropped image to increase the contrast between the lesion and the background. The enhancement processing is beneficial to the recognition of the lesion by the algorithm model. The enhancement formula is shown in a formula (2). The enhanced image is shown in FIG. 7.

$$e\_image(x,y) = 4*\text{crop\_image}(x,y) - 4*\text{Gaussion}(x,y,\rho) + 128 \quad (2)$$

In the formula (2), Gaussion(x, y, ρ) represents Gaussian filter with a standard deviation of ρ. In the present embodiment, ρ=17.

The segmentation network module receives the input image, and then discriminates whether each pixel of the image belongs to the background or the lesion. The specific operation steps are as follows.

(1) The enhanced image e_image is input into the designed network model, and e_image first completes the image downsampling function through the encoder module of the network. The features of its encoder module are as follows.

Figure 8:
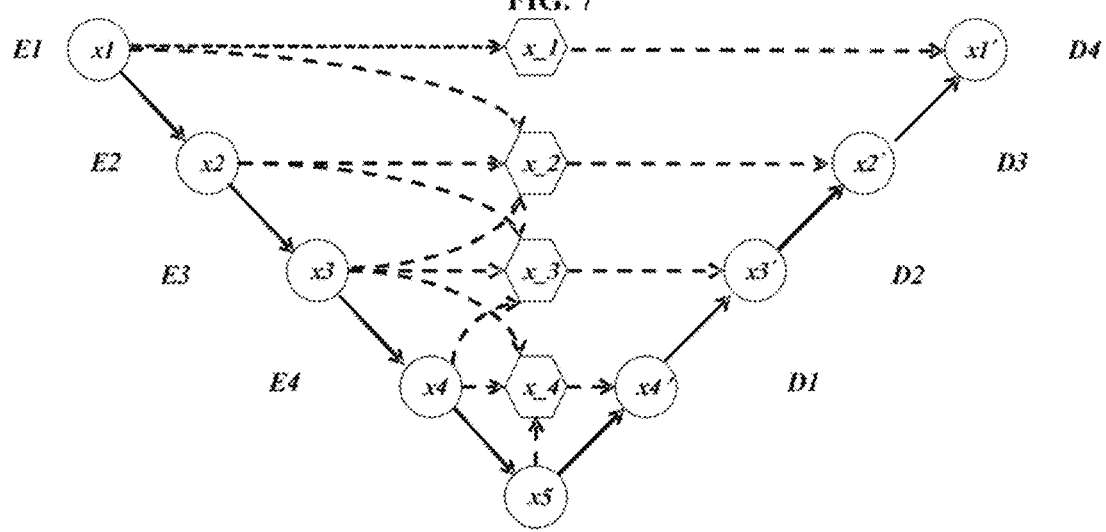
FIG. 8 is an overall schematic diagram of a network model provided by Embodiment III of the present disclosure.
Figure 9:
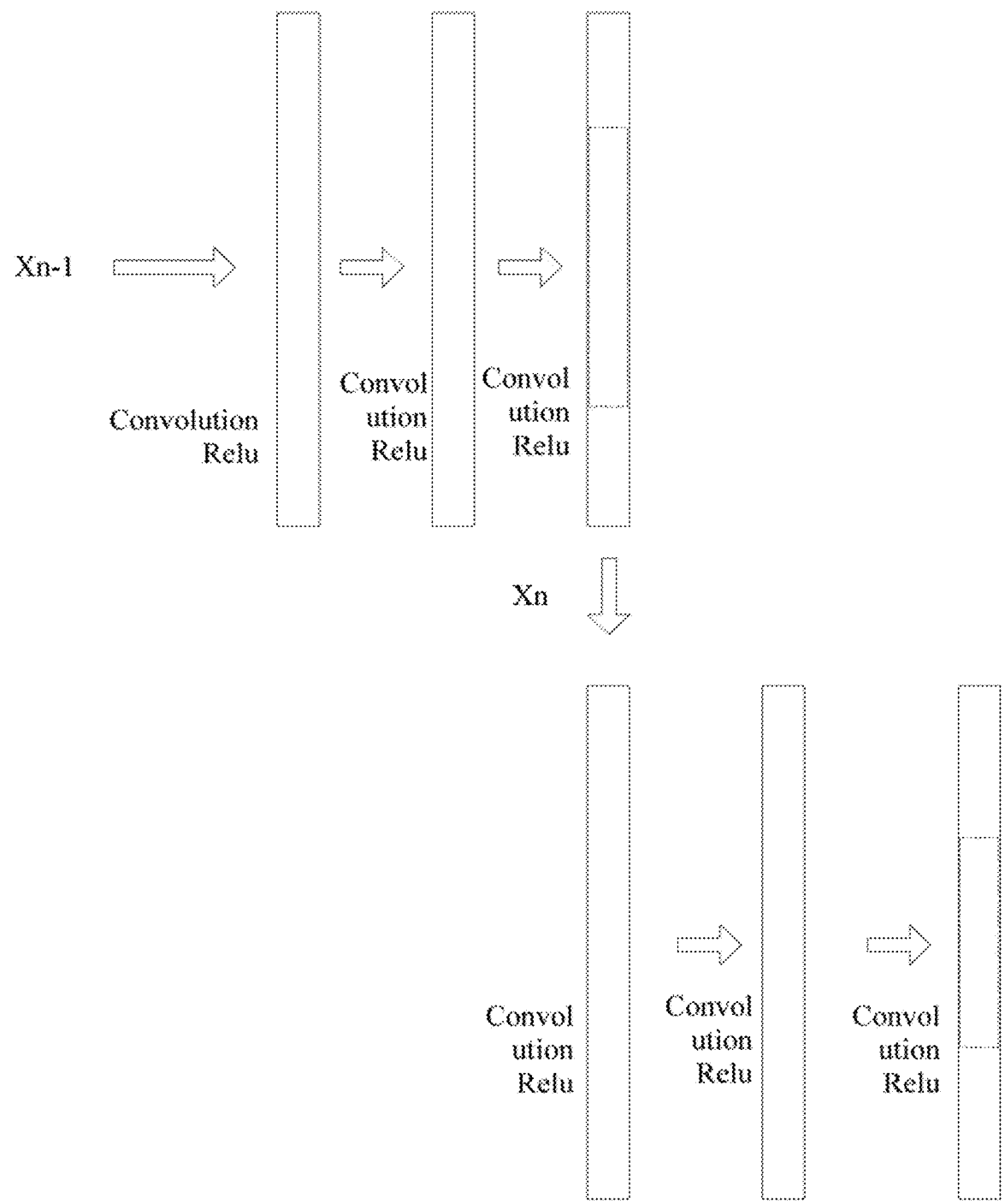
FIG. 9 is a schematic diagram of an internal structure of an encoder module provided by Embodiment III of the present disclosure.

The encoder module of the network is shown in the left half of FIG. 8, including four small modules E1, E2, E3, and E4. The internal structure of each module is shown in FIG. 9, including three 3×3 convolutional layers and a maximum pooling layer, and the stride of the maximum pooling layer is set to 2. After passing through the E1-E4 modules, the feature map FE after e_image is downsampled by a factor of 16 is obtained.

(2) The feature map FE passes through the decoder module of the network and is combined with the dynamic weighted attention mechanism module and the encoder module to realize the upsampling operation of the feature map and the fusion of features. The output is recorded as FO, and features of its decoder module and dynamic weighted attention mechanism model are as follows.

Figure 10:
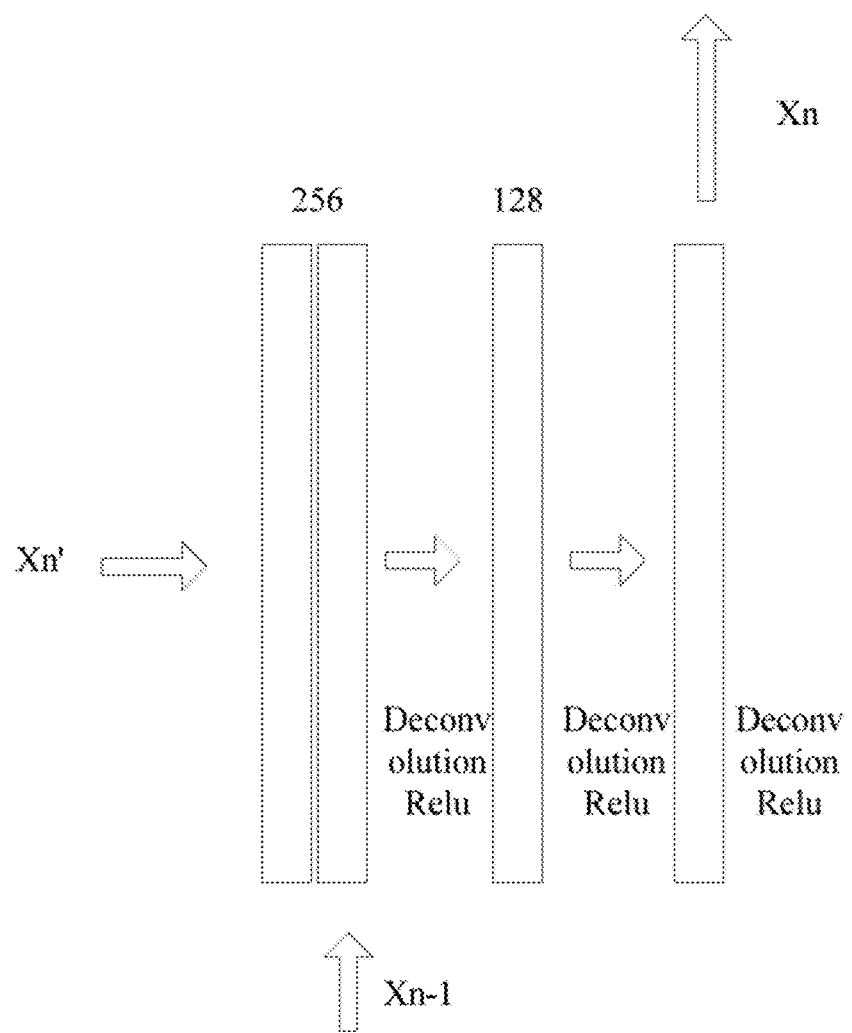
FIG. 10 is a schematic diagram of an internal structure of a decoder module provided by Embodiment III of the present disclosure.

(2.1) The decoder module of the network is shown in the right half of FIG. 8, including four small modules D1, D2, D3, and D4. The internal structure of each module is shown in FIG. 10. It receives two data inputs. One input comes from the output G1 of the previous layer of the network, and the other comes from the feature output G2 of the same layer and the adjacent layer of the encoder module after fusion through the dynamic weighted attention mechanism module. After fusion in the channel dimension, the two-way features pass through three 3×3 deconvolution layers and an upsampling layer. The stride of upsampling is set to 2, and the current output of the decoder layer can be obtained. After passing through the D1-D4 modules, the feature map FO after the decoder module is upsampled by a factor of 16 is obtained.

Figure 11:
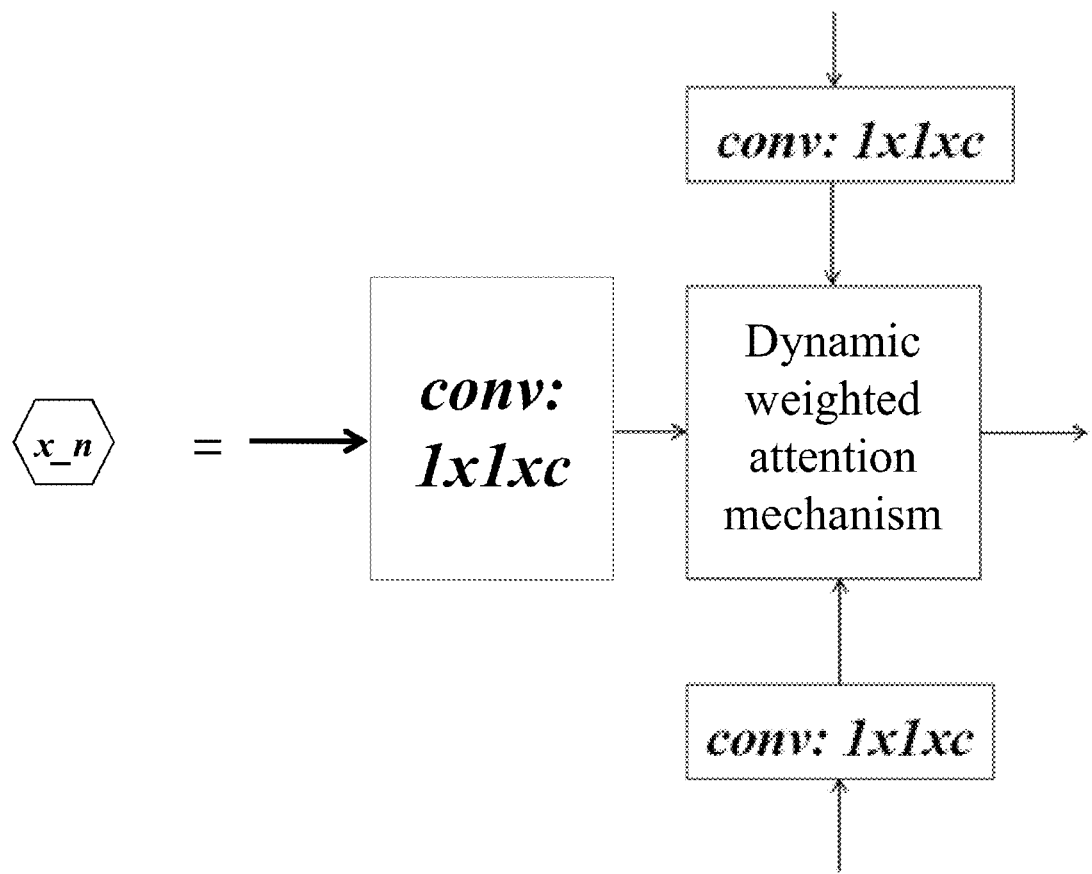
FIG. 11 is a schematic diagram of an internal structure of a dynamic weighted attention mechanism module provided by Embodiment III of the present disclosure.

(2.2) The above dynamic weighted attention mechanism module is shown in the middle part of FIG. 8, and its internal structure is shown in FIG. 11. Here, the output of the n-th layer of the encoder structure is defined as $e\_out^n$, the input from the n−1 layer in the decoder structure is $d\_in^n$, and the output of the n-th layer is $d\_out^n$. For the n-th module, $x\_n$ first receives the input from the current layer of the encoder structure, the input of the previous layer and the input of the next layer, namely $e\_out^n$, $e\_out^{n-1}$, and $e\_out^{n+1}$. Before dynamic weighted attention mechanism feature fusion of $e\_out^{n-1}$, $e\_out^n$, and $e\_out^{n+1}$, it is necessary to perform a 1×1×c convolution operation on $e\_out^n$, downsampling by a factor of 2 and a 1×1×c convolution operation on $e\_out^{n-1}$, and upsampling by a factor of 2 and a 1×1×c convolution operation on $e\_out^{n+1}$. The goal is to ensure that after 1×1×c convolution, the number of output channels of $e\_out^{n-1}$, e_out$^n$, and e_out$^{n+1}$ is consistent with that of the output channels of the corresponding layers in the decoder structure. Specifically, the update operation formulas for e_out$^{n-1}$, e_out$^n$, and e_out$^{n+1}$ are the following formulas: (3)-(5).

$$e\_out^{n'}=conv(3,3,c)(e\_out^n) \quad (3)$$

$$e\_out^{n-1'}=down\_sample(conv(3,3,c),stride=2)(e\_out^{n-1}) \quad (4)$$

$$e\_out^{n+1'}=up\_sample(conv(3,3,c),stride=2)(e\_out^{n+1}) \quad (5)$$

In the formula, conv(3, 3, c) represents the convolution operation. 3 represents the size of the convolution kernel. c represents the number of output channels, which is consistent with that of the output channels of the corresponding layers in the decoder structure. down_sample means downsampling. up_sample means upsampling. stride means stride.

Then, e_out$^{n-1'}$, e_out$^{n'}$, and e_out$^{n+1'}$ are input into the dynamic weighted attention mechanism module for hierarchical feature fusion. Inside the dynamic weighted attention mechanism module, the mean and standard deviation of e_out$^{n-1'}$, e_out$^{n'}$, and e_out$^{n+1'}$ feature maps in the channel direction are first calculated by formulas (6)-(7).

$$V_{H \times W} = \frac{1}{c} * sum(F_{C \times H \times W}, axis=2) \quad (6)$$

$$\sigma_{H \times W} = sqrt(std(F_{C \times H \times W}, axis=2)) \quad (7)$$

In the formula (6), $F_{C \times H \times W}$ represents the input feature map currently processed, namely e_out$^{n-1'}$, e_out$^{n'}$, and e_out$^{n+1'}$. C represents the number of channels of the currently processed feature map. H×W represents the height and width of the currently processed feature map. sum represents the sum operation. axis=2 means performing the corresponding operation in the channel direction. $V_{H \times W}$ represents the output after averaging the input feature map in the channel direction. In the formula (7), $\sigma_{H \times W}$ represents the output after the standard deviation is calculated in the channel direction. std represents the variance operation, and sqrt represents the square root operation.

The mean and variance of the corresponding feature map, e_out$^{n-1'}$, e_out$^{n'}$, and e_out$^{n+1'}$, in the channel direction can be obtained through the formulas (6)-(7), which are recorded as $V_{H \times W}^{n-1}$, $V_{H \times W}^{n}$, $V_{H \times W}^{n+1}$, $\sigma_{H \times W}^{n}$, $\sigma_{H \times W}^{n}$, and $\sigma_{H \times W}^{n+1}$ respectively. Then, the dynamic weights of e_out$^{n-1'}$, e_out$^{n'}$, and e_out$^{n+1'}$ are calculated through one-dimensional Gaussian distribution using $V_{H \times W}^{n-1}$, $V_{H \times W}^{n}$, $V_{H \times W}^{n+1}$, $\sigma_{H \times W}^{n-1}$, $\sigma_{H \times W}^{n-1}$, and $\sigma_{H \times W}^{n+1}$. The one-dimensional Gaussian distribution is shown in a formula 8).

$$f(x) = \frac{1}{\sqrt{2\pi}\sigma} e^{-\frac{(x-u)^2}{2\sigma^2}} \quad (8)$$

σ represents the standard deviation, u represents the mean, and u and σ can be calculated by formulas (9)-(10).

$$u_{H \times W}=(V_{H \times W}^{n+1}+V_{H \times W}^{n}+V_{H \times W}^{n+1})/3 \quad (9)$$

$$\sigma_{H \times W}=(\partial_{H \times W}^{n-1}, \partial_{H \times W}^{n}, \partial_{H \times W}^{n+1})/3 \quad (10)$$

After obtaining $u_{H \times W}$ and $\sigma_{H \times W}$, the weight of each pixel of e_out$^{n-1''}$, e_out$^{n''}$, and e_out$^{n+1''}$ in the channel direction can be calculated by formulas (11)-(13).

$$w_{i,j}^{n-1} = \frac{1}{\sqrt{2\pi}\sigma_{i,j}} e^{-\frac{(-1-u_{i,j})^2}{2\sigma_{i,j}^2}} \quad (11)$$

$$w_{i,j}^{n} = \frac{1}{\sqrt{2\pi}\sigma_{i,j}} e^{-\frac{(0-u_{i,j})^2}{2\sigma_{i,j}^2}} \quad (12)$$

$$w_{i,j}^{n+1} = \frac{1}{\sqrt{2\pi}\sigma_{i,j}} e^{-\frac{(1-u_{i,j})^2}{2\sigma_{i,j}^2}} \quad (13)$$

In the formulas (11)-(13), $w_{i,j}^{n-1}$ represents the weight of the feature map e_out$_{n-1}$' at the position [i,j], i∈[0, H],j∈[0, W] in the channel direction, $W_{i,j}^{n}$ represents the weight of the feature map e_out$^{n'}$ at the position [i, j], i∈[0, H], j∈[0, W] in the channel direction, and $W_{i,j}^{n+1}$ represents the weight of the feature map e_out$^{n+1'}$ at the position [i, j], i∈[0, H], j∈[0, W] in the channel direction.

The attention weights $W^{n-1}$, $W^n$, and $W^{n+1}$ of the entire plane can be obtained by calculating all the pixels of the H×W plane through the formulas (11)-(13).

According to the obtained $W^{n-1}$, $W^n$, and $W^{n+1}$, weighted attention feature fusion is performed on the feature maps e_out$^{n-1'}$, e_out$^{n'}$, and e_out$^{n+1'}$ by a formula (14).

$$fuse^n=W^{n-1}*e\_out^{n-1'}+W^n*e\_out^{n'}+W^{n+1}*e\_out^{n+1'}, \quad (14)$$

In the formula (14), fuse$^n$ represents the_output after feature weighting on e_out$^{n-1'}$, e_out$^{n'}$, and e_out$^{n+1'}$.

The result obtained at this time is recorded as one of the above inputs G2. d_in$^{n-1}$ is one of the above inputs G1.

(2.3) The output of the n-th layer in the decoder structure can be obtained by substituting fuse$^n$ and d_in$^n$ into a formula (15).

$$d\_out^n=repeat(conv(concate(fuse^n,d_{in}^n,axis=2),3,3),2) \quad (15)$$

In the formula (15), repeat(x,2) means that the x operation is performed twice. concate(x,y,axis=2) means stacking x and y in the channel direction. conv(x,3,3) means performing a 3×3 convolution operation on x.

(2.4) Through the formula (15), the output of each layer d_out$^n$ can be obtained in sequence, and the output of the last layer d_out$^4$ can be obtained.

(3) A 1×1×c convolution operation is performed on the output d_out$^4$ of the last layer, where c represents the number of classification categories. In the present embodiment, c is set to 2, and then the softmax normalization function is added for normalization to the 0-1 interval. 0.5 is taken as the discrimination basis, such that the probability of the corresponding category of each pixel can be output.

Model training module: the model training stage includes three parts. The first part is the preparation of training data. The fundus image data is labeled by professional ophthalmologists to form gold standard data. The second part is the setting of model parameters, and the third part is the dynamic expansion of data during training. The Xaiver parameter initialization method is used for model parameters. The loss function uses the softmax cross-entropy loss function, and the optimization method adopts the Adam optimization method. The learning rate is initially set to 0.001, and every 50 epochs, the learning rate is reduced to 1/10 of the original. During training, the model will select batch data for training each time. In this solution, the batch is set to 8. Before entering the data into the network, this solution randomly amplifies the data read into the memory. The specific method is that the algorithm will dynamically generate a label for each image, and each label corresponds to an image amplification method. The data in the same batch will correspond to multiple amplification methods, and when the same image is processed next time, because the labels generated before and after are different, the corresponding amplification methods are also different, which greatly enriches the diversity of training data and avoids overfitting or underfitting of the model during training. The amplification methods herein include, but are not limited to, image translation, image brightness adjustment, image contrast adjustment, image median filtering, and image mean filtering.

Forward reasoning module: a color fundus image of a newborn is given. First, the image is normalized. Cropping and enhancement operations are performed. Then the processed image pairs are input into the entire network model. The network obtains the feature map of the corresponding layer and calculates $W^{n-1}$, $W^n$, and $W^{n-1}$ to perform weighted fusion on the corresponding feature map to realize the self-attention mechanism, and then the lesion extraction information of the fundus image of the newborn can be obtained.

Postprocessing module: during acquisition of the fundus image of the newborn, due to the limited degree of cooperation, the captured fundus images often have light leakage and are too dark. Therefore, it is necessary to perform postprocessing operations on the lesion information extracted by the network model. The specific process of the postprocessing operations of this solution is to delete the lesions with an area less than a certain threshold, because most of the lesions with too small area are mislabeled pixels caused by noise.

Figure 12:
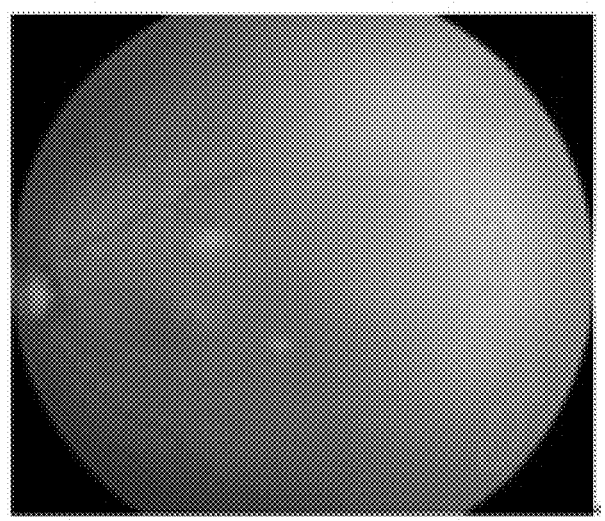
FIG. 12 is a schematic diagram of visualizing features of ROP provided by Embodiment III of the present disclosure.

Output module: the final output of the present embodiment includes two parts. One part is whether there is ROP in the detected images. The other part is the visualization of the visualizing features of abnormal ROP, as shown in FIG. 12.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present description shall not be construed as limitations to the present disclosure.

What is claimed is:

1. A method for detecting a fundus image based on a dynamic weighted attention mechanism, comprising:
   obtaining a fundus image comprising a plurality of pixels; and
   detecting lesion information of the fundus image using a fundus image segmentation model, wherein the fundus image segmentation model comprises n consecutive downsampling layers and n consecutive upsampling layers, and an n-th downsampling layer is connected to a first upsampling layer:
   performing consecutive n-layer downsampling on the fundus image using the fundus image segmentation model to obtain n layers of downsampling output features;
   fusing a downsampling output feature of an i-th layer and a downsampling output feature of an adjacent layer using the dynamic weighted attention mechanism to obtain a weighted feature of the i-th layer, wherein a weighted feature of a first layer is a downsampling output feature of the first layer;
   fusing the weighted feature of the i-th layer with an output feature of an (n−i)-th upsampling layer to obtain fused features;
   inputting the fused features to an (n−i+1)-th upsampling layer after deconvolution, wherein an input of the first upsampling layer is a feature after the fusing and deconvolution of a weighted feature of an n-th layer and a downsampling output feature of the n-th layer; and
   performing a classification convolution operation on an output of an n-th upsampling layer to obtain a lesion probability for each of the plurality of pixels;
   wherein the fusing of the downsampling output feature of the i-th layer and the downsampling output feature of the adjacent layer using the dynamic weighted attention mechanism to obtain the weighted feature of the i-th layer comprises:
   obtaining the downsampling output feature of the i-th layer, a downsampling output feature of an (i−1)-th layer, and a downsampling output feature of an (i+1)-th layer; and
   performing hierarchical feature fusion on the downsampling output feature of the i-th layer, the downsampling output feature of the (i−1)-th layer, and the downsampling output feature of the (i+1)-th layer:
   calculating a mean and a standard deviation of the downsampling output feature of the i-th layer, the downsampling output feature of the (i−1)-th layer, and the downsampling output feature of the (i+1)-th layer in a channel direction;
   calculating a dynamic weight of the downsampling output feature of the i-th layer, the downsampling output feature of the (i−1)-th layer, and the downsampling output feature of the (i+1)-th layer through one-dimensional Gaussian distribution according to the mean and the standard deviation;
   calculating a weight of each pixel in the downsampling output feature of the i-th layer, the downsampling output feature of the (i−1)-th layer, and the downsampling output feature of the (i+1)-th layer in the channel direction according to the dynamic weight;
   calculating an attention weight of the downsampling output feature of the i-th layer, the downsampling output feature of the (i−1)-th layer, and the downsampling output feature of the (i+1)-th layer according to the weight of each pixel in the channel direction; and
   performing weighted attention feature fusion on the downsampling output feature of the i-th layer, the downsampling output feature of the (i−1)-th layer, and the downsampling output feature of the (i+1)-th layer according to the attention weight to obtain the weighted feature of the i-th layer.

2. The method for detecting a fundus image based on the dynamic weighted attention mechanism according to claim 1, wherein the performing of the classification convolution operation on the output of an n-th upsampling layer to obtain the lesion probability for each of the plurality of pixels comprises:

performing a 1×1×c convolution operation on the output of the n-th upsampling layer to obtain the lesion probability for each pixel, wherein c represents a number of classification categories.

3. The method for detecting a fundus image based on the dynamic weighted attention mechanism according to claim 1, further comprising, after performing the classification convolution operation on an output of an n-th upsampling layer:

normalizing convolution results using a softmax normalization function.

4. The method for detecting a fundus image based on the dynamic weighted attention mechanism according to claim 1, further comprising, after the obtaining of the downsampling output feature of the i-th layer, the downsampling output feature of an (i−1)-th layer, and the downsampling output feature of an (i+1)-th layer:

performing a 1×1×c convolution operation on the downsampling output feature of the i-th layer, wherein c represents a number of output channels;

performing downsampling and a 1×1×c convolution operation on the downsampling output feature of the (i−1)-th layer; and performing upsampling and a 1×1×c convolution operation on the downsampling output feature of the (i+1)-th layer.

5. The method for detecting a fundus image based on the dynamic weighted attention mechanism according to claim 1 comprising training the fundus image segmentation model specifically, wherein the training comprises:

obtaining gold standard data, wherein the gold standard data is a fundus image of a target area comprising one or more labels; and training a network model based on the dynamic weighted attention mechanism using the gold standard data to obtain the fundus image segmentation model.

6. The method for detecting a fundus image based on the dynamic weighted attention mechanism according to claim 1, further comprising, after the obtaining of the fundus image:

performing invalid region cropping and image enhancement on the fundus image.

7. The method for detecting a fundus image based on the dynamic weighted attention mechanism according to claim 6, wherein a formula of image enhancement is:

$$e\_image(x,y)=4*crop\_image(x,y)-4*Gaussion(x,y,\rho)+128,$$

wherein e_image(x, y) represents an enhanced image, crop_image(x, y) represents an image after invalid region cropping, and Gaussion(x, y, ρ) represents Gaussian filter with a standard deviation of ρ.

\* \* \* \* \*